United States Patent [19]
Murashima et al.

[11] Patent Number: 4,853,789
[45] Date of Patent: Aug. 1, 1989

[54] AUTOMATIC FOCUSING CIRCUIT USING A TWO PERIOD DETECTION INTERVAL TO COMPENSATE FOR MOTION OCCURRING WITHIN A FIELD OF VIEW

[75] Inventors: Hirotsugu Murashima, Yamatotakada; Satoru Maeda, Hirakata, both of Japan

[73] Assignee: Sanyo Electric Co., Ltd., Osaka, Japan

[21] Appl. No.: 155,901

[22] Filed: Feb. 16, 1988

[30] Foreign Application Priority Data

Feb. 18, 1987 [JP] Japan ................................. 62-34767

[51] Int. Cl.$^4$ ............................................. H04N 5/232
[52] U.S. Cl. ..................................... 358/227; 358/225
[58] Field of Search ......................... 358/227, 225, 55; 250/201

[56] References Cited

U.S. PATENT DOCUMENTS

| 4,531,158 | 7/1985 | Murakami et al. | 358/227 |
| 4,614,975 | 9/1986 | Kaite | 358/227 |
| 4,638,364 | 1/1987 | Hiramatu | 358/227 |
| 4,647,979 | 3/1987 | Urata | 358/227 |

FOREIGN PATENT DOCUMENTS

| 58505 | 4/1983 | Japan . |
| 109032 | 6/1984 | Japan . |
| 103776 | 6/1985 | Japan . |
| 135712 | 9/1985 | Japan . |
| 84168 | 4/1986 | Japan . |
| 163475 | 7/1987 | Japan . |

Primary Examiner—James J. Groody
Assistant Examiner—Robert M. Bauer
Attorney, Agent, or Firm—Peter L. Michaelson

[57] ABSTRACT

In an automatic focusing circuit of a video camera, an automatic focusing operation is performed by a focus evaluating value produced in response to a video signal obtained in an image sensing circuit (4). A focusing motor control circuit (14) controls rotation of a focusing motor (3) so that a focusing lens (1) is once fixed in the position where the focus evaluating value takes the maximum value. Then, a control circuit (14) resumes the automatic focusing operation after a lapse of a second time period when it is determined that the focus evaluating value was decreased to a predetermined level during a first time period and maintained the level over the second time period, and does not resume the automatic focusing operation when it is determined that the focus evaluating value did not maintain the level. On the other hand, the control circuit (14) resumes the automatic focusing operation after a lapse of the first time period when it is determined that a time period which is more than the first time period is required until the focus evaluating value attains the predetermined level.

18 Claims, 6 Drawing Sheets

AUTOMATIC FOCUSING CIRCUIT USING A TWO PERIOD DETECTION INTERVAL TO COMPENSATE FOR MOTION OCCURRING WITHIN A FIELD OF VIEW

BACKGROUND OF THE INVENTION

1. Field of the Invention

The present invention relates to an automatic focusing circuit and more particularly, to an improvement of an automatic focusing circuit for automatically matching the focus in response to a video signal obtained from an image sensor, in an image sensing apparatus such as a video camera and an electronic still camera having an automatic focusing mechanism.

2. Description of the Prior Art

Conventionally, in an automatic focusing apparatus used in an image sensing apparatus such as a video camera and an electronic still camera, an approach utilizing a video signal itself obtained from an image sensor for evaluating the state in which the focus is controlled has been developed. According to such an approach, many good characteristics can be obtained. For example, there exists substantially no parallax. In addition, even if the depth of field is small and an object is located in the distance, the focus can be exactly matched. Furthermore, according to this approach, a specific sensor for automatic focusing need not be separately provided, so that the apparatus is very simple as a mechanism.

As an example of such a focus control method utilizing a video signal, a control method referred to as a so-called hill-climbing servo system has been conventionally known. The hill-climbing servo system is described in, for example, U.S. Pat. Nos. 4,638,364, 4,614,975, Japanese Patent Laying-Open Gazettes Nos. 58505/1983 and 103776/1985. Briefly stated, a high frequency component of a video signal obtained from an image sensor is detected every one field as a focus evaluating value, the detected focus evaluating value is always compared with a focus evaluating value detected one field before, and the position of a focusing lens continues to be slightly vibrated so that the focus evaluating value always takes the maximal value.

Figure 1:
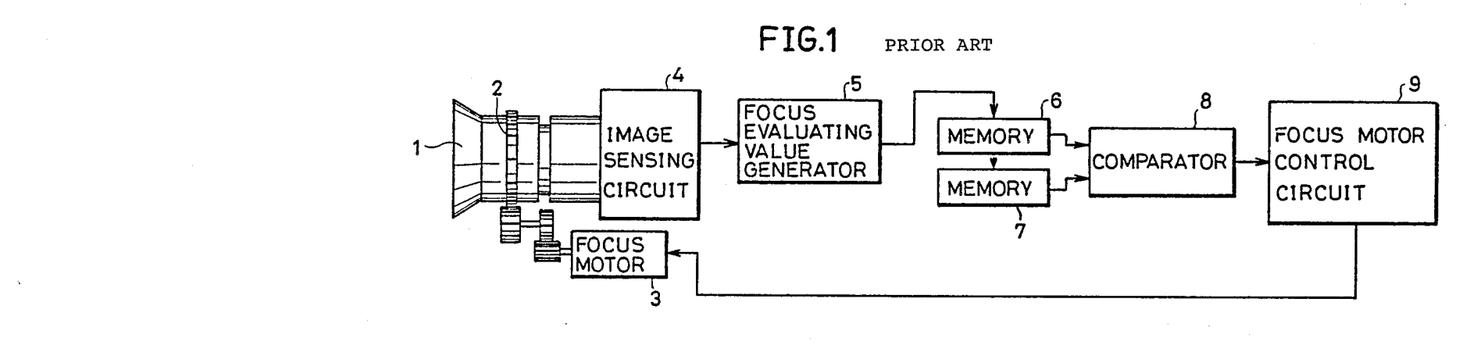
FIG. 1 is a schematic block diagram showing an example of a conventional automatic focusing circuit.
Figure 2:
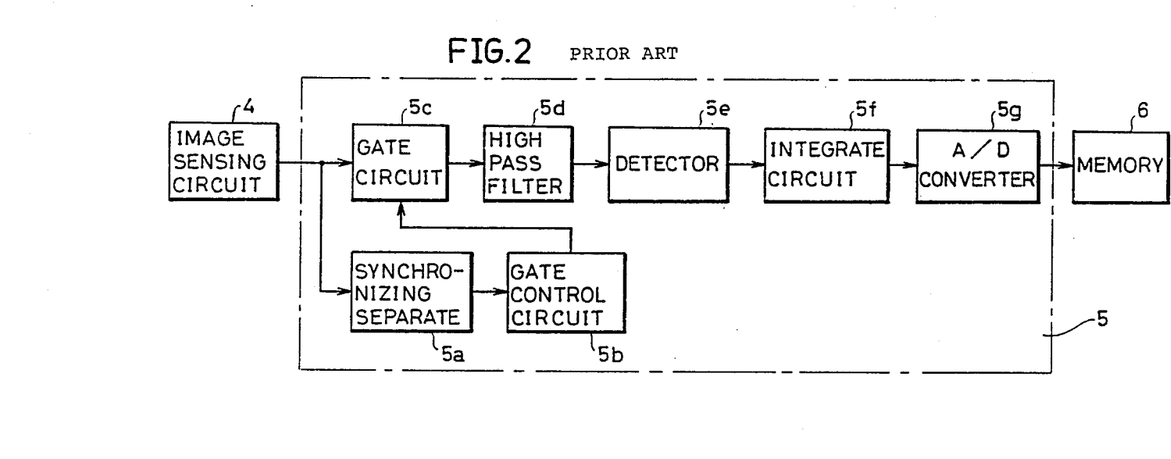
FIG. 2 is a block diagram showing the details of a focus evaluating value generating circuit shown in FIG. 1.

FIG. 1 is a schematic block diagram showing an example of an automatic focusing circuit for a conventional video camera utilizing such a hill-climbing servo system, and FIG. 2 is a block diagram showing the details of a focus evaluating value generating circuit 5 shown in FIG. 1.

Referring to FIGS. 1 and 2, description is made on a conventional automatic focusing circuit using a hill-climbing servo system.

Referring to FIG. 1, a video camera comprises a focusing ring 2 for moving a focusing lens 1, a focusing motor 3 for driving the focusing ring 2, and an image sensing circuit 4 including an image sensor (not shown) such as a CCD (Charge Coupled Device). The focusing lens 1 may be moved by a piezoelectric element instead of a motor. In addition, the image sensor itself (not shown) such as the CCD instead of the focusing lens 1 may be moved by the piezoelectric element.

An image formed on a surface of the image sensor by the focusing lens 1 is converted into a video signal by the image sensing circuit 4 and inputted to the focus evaluating value generating circuit 5. Referring to FIG. 2 showing the details of the focus evaluating value generating circuit 5, a luminance signal component in a video signal outputted from the image sensing circuit 4 is applied to a synchronizing separator circuit 5a and a gate circuit 5c. The synchronizing separator circuit 5a separates a vertical synchronizing signal VD and a horizontal synchronizing signal HD from the inputted luminance signal and applies the same to a gate control circuit 5b. The gate control circuit 5b sets a rectangular sampling area in a central portion of a picture in response to the inputted vertical synchronizing signal VD and horizontal synchronizing signal HD and a fixed output of an oscillator (not shown). The gate control circuit 5b applies a signal for opening or closing a gate every field to the gate circuit 5c so that passage of the luminance signal is permitted only in the range of the sampling area. The gate circuit 5c may be provided anywhere in the former stage of an integration circuit 5f as described below.

Only the luminance signal corresponding to the range of the sampling area is applied to a high-pass filter 5d every field by the gate circuit 5c. The high frequency component of the video signal separated by the high-pass filter 5d is amplitude-detected by a detector 5e, the detected output being applied to the integration circuit 5f. The integration circuit 5f integrates every field the detected output applied thereto, the integrated output being applied to an A/D converter 5g. The A/D converter 5g converts the integrated value inputted thereto into a digital value and supplies the digital value as a focus evaluating value in the current field. The supplied focus evaluating value is applied to a first memory 6 as described below.

Returning to FIG. 1, a focus evaluating value outputted from a focus evaluating value generating circuit 5 is stored in the first memory 6. When a focus evaluating value in the next field is then outputted from the focus evaluating value generating circuit 5, data stored in the first memory 6 is transferred to a second memory 7. More specifically, the contents of the first memory 6 and the second memory 7 are updated every field, so that the newest focus evaluating value and a focus evaluating value one field before are always stored in the first memory 6 and the second memory 7, respectively. The contents of the two memories 6 and 7 are inputted to a comparator 8 and compared therein. The compared output is applied to a focusing motor control circuit 9.

As a result of comparison by the comparator 8, when the focus evaluating value stored in the first memory 6 is larger than that stored in the second memory 7, the focus evaluating value is increasing, so that the focusing motor control circuit 9 maintains the current rotational direction of the focusing motor 3 in response to an output of the comparator 8. On the other hand, when the focus evaluating value stored in the first memory 6 is smaller than that stored in the second memory 7, the focus evaluating value is decreasing, so that the focusing motor control circuit 9 reverses the rotational direction of the focusing motor 3 in response to the output of the comparator 8. The focusing ring 2 supporting the focusing lens 1 continues to move in the direction of increasing a focus evaluating value by such movement of the focusing motor 3, so that the in-focus state is achieved. After achieving the in-focus state, the focusing ring 2 and the focusing lens 1 continue to be vibrated back and forth in the vicinity of the maximal point of the focus evaluating value.

In the above described hill-climbing servo system, if only the slope of a focus evaluating value is detected, the focusing lens 1 is not stopped in the defocused position by driving the focusing lens 1 in the direction of always increasing the focus evaluating value even if the object is changed, so that very good follow-up characteristics can be achieved.

However, such a hill-climbing servo system suffers from the following significant disadvantages caused by continuing to vibrate the position of the focusing lens.

A first disadvantage is that since the focusing lens is not stopped even in the in-focus state, a picture continues to be vibrated even if an object at rest is in focus. For example, the focal length of a lens currently used in a television camera is changed by rotating a focusing ring, so that the angle of field of a sensed image is changed. Therefore, in the above described system in which the focusing ring continues to be vibrated even in the in-focus state, an object on the picture becomes large or small with a particular cycle, resulting in a very unclear picture.

A second disadvantage is directed to a power consumption. There are many cases where a home video camera currently utilizes a battery as a power supply due to the portability thereof. When a focusing motor is always driven as in the above described hill-climbing servo system so that the forward rotation and the reverse rotation are repeated, more power is consumed, as compared with when the focusing motor is rotated in a constant direction, due to in-rush current, so that the time period during which an image can be recorded by using such a battery becomes short.

Additionally, since the focusing ring is always rotated, a problem of wear of a gear occurs, for example.

In order to overcome these disadvantages, there is proposed a system for detecting the maximal point where a focus evaluating value is changed from an increasing tendency to a decreasing tendency by driving a focusing ring in a one-way direction, and returning the focusing ring to the maximal point and stopping the same therein, which is disclosed in Japanese Utility Model Laying-Open Gazette No. 135712/1985. In detecting the maximal value, focus evaluating values are compared every one field, the larger focus evaluating value is always stored as the maximum value, and the maximum value is determined as the maximal value when it is determined that the current focus evaluating value has dropped, by a predetermined threshold value, from the maximum value.

On the other hand, in a video camera, the position of the focus must be changed, following an object which changes momentarily. Even after the lens is once stopped in the in-focus position as described above, a hill-climbing operation of the lens must be resumed when the distance between the object and the lens is changed. Therefore, an approach of determining that an object changed when the focus evaluating value changed, by more than a predetermined threshold value, while the focusing lens is stopped and of resuming the hill-climbing operation is proposed by one of the inventors of the present invention, which is disclosed in Japanese Patent Application No. 252545 filed Nov. 11, 1985. According to this approach, the position of the focus can be changed following an object which changes momentarily. On the other hand, this approach suffers from disadvantages as described below.

Figure 3A:
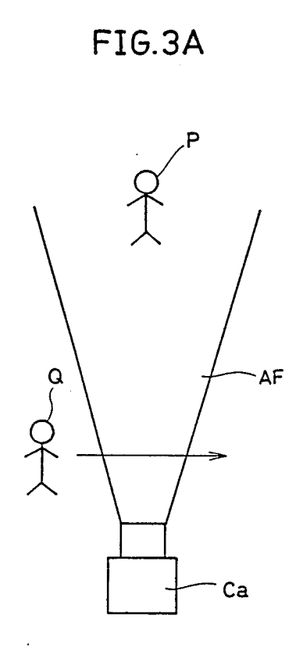
FIGS. 3A, 3B and 3C are diagrams for explaining diagrammatically movement of an object in an automatic focusing area.

More specifically, when an object to be sensed is in focus, if the other object crosses an area between the video camera and the object to be sensed and more particularly, a field of view (referred to as an automatic focusing area hereinafter) corresponding to the above described sampling area set in a picture, then the lens is displaced such that the other object is brought into focus. As a result, an image of the original object is defocused and the angle of field is changed, resulting in a very unclear image. FIG. 3A is a diagram showing diagrammatically such a case. Referring to FIG. 3A, it is assumed that a video camera Ca is recording an original object P in an in-focus state and the other object Q is out of an automatic focusing area AF which is a field of view corresponding to the above described sampling area. When the other object Q enters the automatic focusing area AF and passes in front of the camera Ca as represented by an arrow in FIG. 3A, all or a part of the original object P seen from the camera Ca is obstructed by the other object. Consequently, a hill-climbing operation is resumed such that the other object Q is brought into focus, so that the lens begins to move. However, since some time periods are required until the object Q is in focus, the object Q has passed through the automatic focusing area AF before movement of the lens is completed. As a result, while the object Q is passing through the automatic focusing area, the object P is out of focus and the object Q is not in focus. In addition, immediately after passage of the object Q is completed, the original object P is on the picture in the defocused state, resulting in a very unclear picture.

Conventionally, in the case of the transition from the in-focus state to the defocused state, an approach of always prohibiting driving of the lens during a constant time period, for example, the time period expected to be required until the object Q has passed through the automatic focusing area AF has been proposed. According to this approach, the hill-climbing operation is not resumed in the case of transient passage as shown in FIG. 3A. On the other hand, if the other object Q enters the automatic focusing area AF and then remains in this area while the object P is recorded as shown in FIG. 3C, the hill-climbing operation is resumed such that the object Q is brought into focus after a constant time period.

Figure 3B:
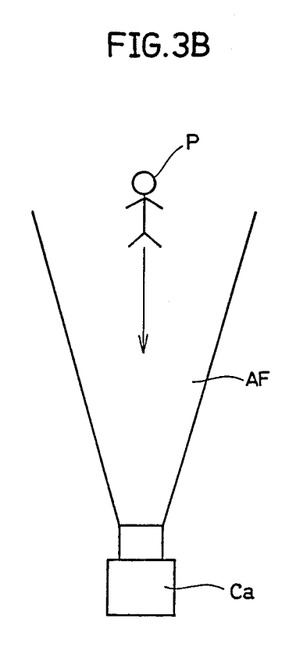
Figure 3C:
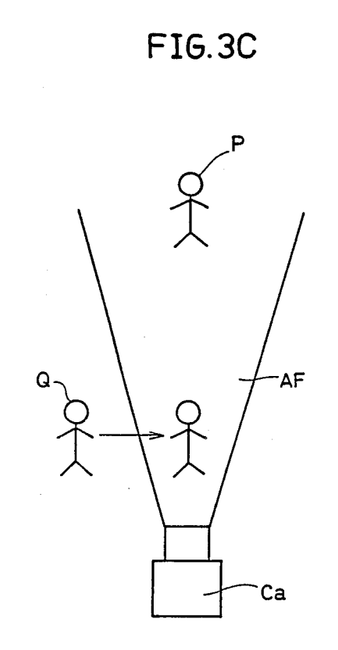

However, according to this approach, if the original object P itself approaches the camera as represented by an arrow in FIG. 3B (or leaves the camera), it is not until the above described constant time period is elapsed after the defocused state is determined that driving of the lens is resumed, so that follow-up characteristics of the focus relative to the object is decreased and response characteristics of the automatic focusing operation is decreased.

SUMMARY OF THE INVENTION

Therefore, a primary object of the present invention is to provide an automatic focusing circuit in which a stable automatic focusing operation can be performed and an unclear picture can be prevented even if the other object passed in front of a camera when the original object is in focus.

Another object of the present invention is to provide an automatic focusing circuit in which an automatic focusing operation having good follow-up characteristics can be performed if the original object in the in-focus state approaches or leaves the camera.

Briefly stated, the present invention is directed to an automatic focusing circuit for automatically matching the focus in response to a video signal obtained from image sensing means, the automatic focusing circuit comprising focus evaluating value detecting means for detecting a level of a high frequency component of a video signal every constant time period, converting the level into either a focus evaluating value which takes the maximum value in the in-focus position or a focus evaluating value which takes the minimum value in the in-focus position and sequentially supplying the same. An automatic focusing operation is performed by control means such that the relative position of a focusing lens is once fixed in the position where a focus evaluating value takes the maximum value or the minimum value. Thereafter, the change of an object is detected in response to the change of the focus evaluating value outputted from the focus evaluating value detecting means. This change is detected is response to determination whether or not the focus evaluating value is decreased to a predetermined level during a predetermined first time period and whether or not the focus evaluating value remains at a level less than the predetermined level over a second time period which is longer than the first time period, so that a focusing motor control circuit resumes control of the relative position of the focusing lens in response to the object change detection signal.

In accordance with another aspect of the present invention, the focus evaluating value detecting means converts a video signal corresponding to a predetermined sampling area into a focus evaluating value every constant time period, a first time period being a time period expected to be required until an object other than the object in the in-focus state has entered an automatic focusing area which is a field of view corresponding to the sampling area and a second time period being a time period expected to be required until the other object has passed through the automatic focusing area.

In accordance with still another aspect of the present invention, the control means resumes control of the relative position of the focusing lens after a lapse of the second time period if it is determined that the focus evaluating value is decreased to a predetermined level during the first time period and then, remains at a level less than the predetermined level over the second time period.

In accordance with yet another object of the present invention, the control means does not resume control of the relative position of the focusing lens if it is determined that the focus evaluating value is decreased to a predetermined level during the first time period and then, does not remains at a level less than the predetermined level over the second time period.

In accordance with a further object of the present invention, the control means resumes control of the relative position of the focusing lens after a lapse of the first time period when it is determined that the time period which is longer than the first time period is required until the focus evaluating value is decreased to a predetermined level.

A principal advantage of the present invention is that when an object other than the original object enters the automatic focusing area during the first time period and crosses the automatic focusing area during the second time period, the automatic focusing operation is not resumed, so that an unnecessary automatic focusing operation is not performed, resulting in no unclear image.

Another advantage of the present invention is that if the other object enters the automatic focusing area and then, is stopped therein, the automatic focusing operation is resumed after a lapse of the second time period, so that a new object can be in focus.

Yet another advantage of the present invention is that when the original object itself gradually approaches and leaves the camera, automatic focusing operation can be resumed quickly after a lapse of the first time period, so that an automatic focusing operation having good follow-up characteristics relative to the change of the object can be achieved.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
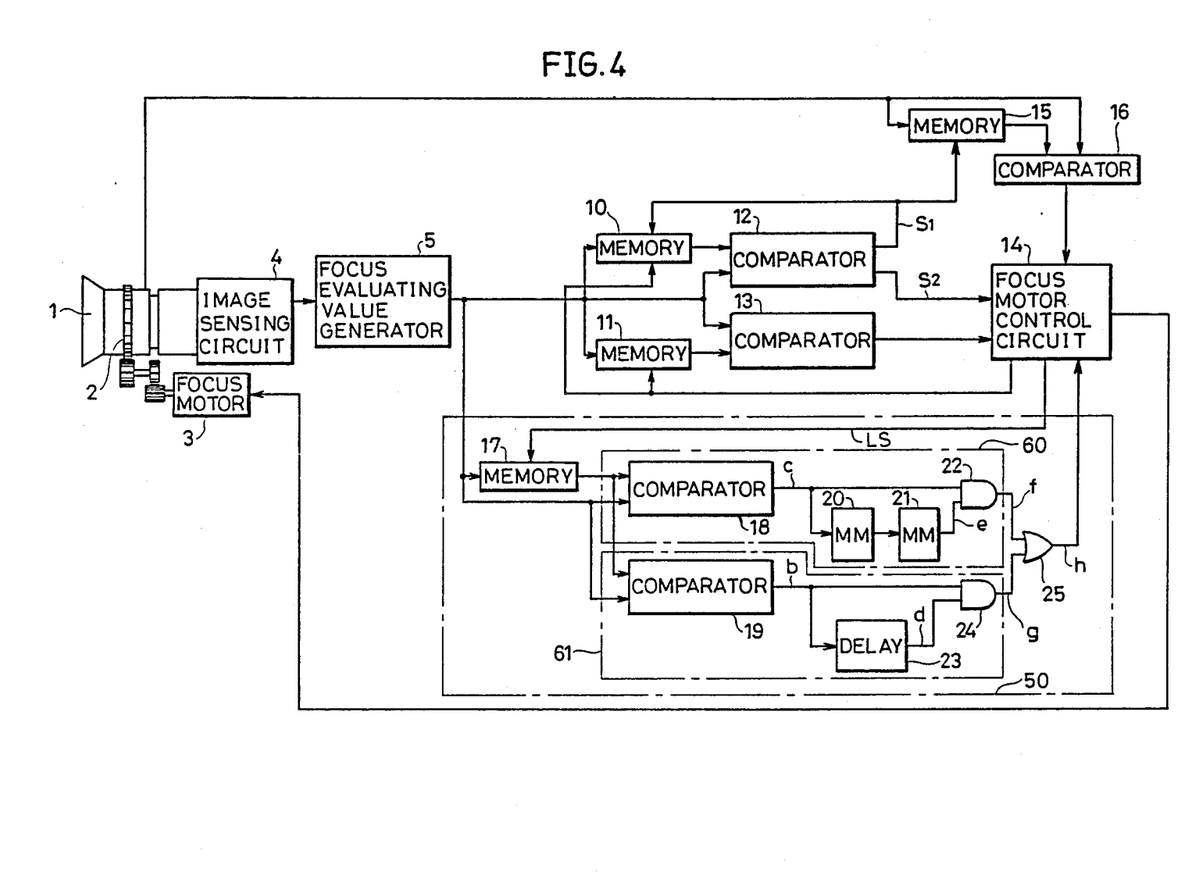
FIG. 4 is a schematic block diagram showing an automatic focusing circuit according to an embodiment of the present invention.

FIG. 4 is a schematic block diagram of an automatic focusing circuit according to an embodiment of the present invention.

Referring to FIG. 4, description will now be made of the automatic focusing circuit according to an embodiment of the present invention. In FIG. 4, a video camera comprises a focusing ring 2 for moving a focusing lens 1, a focusing motor 3 for driving the focusing ring 2, and an image sensing circuit 4 including an image sensor (not shown) such as a CCD, as in the conventional example shown in FIG. 1. The focusing lens 1 may be moved by a piezoelectric element instead of a motor. In addition, the image sensor (not shown) itself such as the CCD instead of the focusing lens may be moved by the piezoelectric element. An image formed on the image sensor by the focusing lens 1 is converted into a video signal by the image sensing circuit 4 and inputted to a focus evaluating value generating circuit 5. The focus evaluating value generating circuit 5 has the same structure as that shown in the above described FIG. 2 and hence, the description thereof is omitted.

Description will now be made of the operation that occurs immediately after an automatic focusing control is started. Immediately after an automatic focusing operation is started, a focus evaluating value of the first one field outputted from the focus evaluating value generating circuit 5 is first applied to a memory 10 holding the maximum value and a memory 11 holding the initial value and is held therein. Thereafter, the focusing motor control circuit 14 rotates the focusing motor 3 in a predetermined direction. Thereafter, a comparator 13 compares the initial focus evaluating value held in the initial value memory 11 with the current focus evaluating value outputted from the focus evaluating value generating circuit 5 and generates a comparison signal. Accordingly, the focusing motor control circuit 14 initializes the rotational direction of the focusing motor 3 in response to the comparison signal.

More specifically, the focusing motor control circuit 14 rotates the focusing motor 3 in the above described predetermined direction until the comparator 13 generates a comparison output indicating "large" or "small". If and when a comparison output is outputted from the comparator 13 indicating that the current focus evaluating value is larger than the initial focus evaluating value held in the initial value memory 11, the focusing motor control circuit 14 maintains the above described predetermined rotational direction. On the other hand, when a comparison output is obtained indicating that the current focus evaluating value is smaller than the initial focus evaluating value, the focusing motor control circuit 14 reverses the rotational direction of the focusing motor 3. In the above described manner, initialization of the rotational direction of the focusing motor 3 is completed. Thereafter, the focusing motor control circuit 14 monitors an output of a comparator 12. In order to prevent malfunction due to noise of the focus evaluating value, the comparator 13 may be adapted not to generate the comparison output indicating "large" or "small" while the difference between the initial focus evaluating value and the current focus evaluating value does not exceed a predetermined threshold value.

On the other hand, the comparator 12 compares the maximum focus evaluating value so far held in the maximum value memory 10 with the current focus evaluating value outputted from the focus evaluating value generating circuit 5, and outputs three kinds of comparison signals, that is, signals in first, second and third modes in which the current focus evaluating value is larger than, the same as or slightly smaller than, and sufficiently smaller than the focus evaluating value held in the maximum value memory 10, respectively. If and when the current focus evaluating value is larger than the content of the maximum value memory 10, the content of the maximum value memory 10 is updated in response to the output S1 of the comparator 12, so that the maximum value of the focus evaluating value occurring thus far is always held in the maximum value memory 10.

A signal indicating the position of a focusing ring is generated from the focusing ring 2 corresponding to the position of the focusing ring 2 supporting the focusing lens 1 and applied to a memory 15 that holds the position of a focusing ring. The focusing ring position memory 15 is updated in response to the output of the comparator 12 so that the focusing ring position signal that occurs, when the focus evaluating value reaches a maximum value, is always held.

The focusing motor control circuit 14 monitors the output of the comparator 12 while rotating the focusing motor 3 in the direction initialized in response to the output of the comparator 13 as described above. When the output S2, in the third mode in which the current focus evaluating value is sufficiently smaller than the maximum focus evaluating value, is obtained from the comparator 12, the focusing motor control circuit 14 reverses the rotational direction of the focusing motor 3. It is to prevent malfunction due to noise of the focus evaluating value that the focusing motor is first reversed not by the output in the second mode but by the output in the third mode.

After the focusing motor 3 is reversed, a comparator 6 compares the contents of the focusing ring position memory 15 corresponding to the maximum value of the focus evaluating value with the current focusing ring position signal generated from the focusing ring 2. When both coincide with each other, that is, the focusing ring 2 is returned to the position where the focus evaluating value is the maximum, the focusing motor control circuit 14 stops rotation of the focusing motor 3. At the same time, the focusing motor control circuit 14 outputs a lens stop signal LS and applies the same to a memory 17 in a circuit 50 for detecting the change of an object as described below. In the above described manner, a series of automatic focusing operations are completed.

Thereafter, when the change of an object is detected and confirmed by a circuit 50 for detecting the change of an object as described below, a new automatic focusing operation is started to follow the change of the object.

Referring now to FIG. 4, description is made on a structure of the object change detecting circuit 50 according to the present invention.

First, the LS signal is applied to the memory 17 from the focusing motor control circuit 14 in response to completion of the above described series of automatic focusing operations. Correspondingly, a focus evaluating value at that time is held in the memory 17 as a reference value. An output of the memory 17, that is, the above described reference value is applied to one input of a comparator 18 in a detecting circuit 60 and one input of a comparator 19 in a detecting circuit 61 in the subsequent stage. In addition, a focus evaluating value that changes every moment is inputted to the respective other inputs of the comparators 18 and 19 from the focus evaluating value generating circuit 5.

The detecting circuit 60 further comprises a first monostable multivibrator 20 receiving an output of the comparator 18, a second monostable multivibrator 21 receiving an output of the first monostable multivibrator 20 and an AND circuit 22 receiving the output of the comparator 18 and an output of the second monostable multivibrator 21. The comparator 18 has a relative threshold value A (25% of the reference value held in the memory 17, according to the present embodiment) associated with the contents held in the memory 17, and functions to output a signal at an "H" level when the difference between the contents held in the memory 17 and the current focus evaluating value exceeds the threshold value A. Furthermore, in the detecting circuit 60, the first monostable multivibrator 20 outputs a signal which rises in synchronization with the output of the comparator 18, the metastable time period being represented by T2. In addition, the second monostable multivibrator 21 outputs a signal which rises in synchronization with the fall of the output of the first monostable multivibrator 20.

On the other hand, the detecting circuit 61 further comprises a delay circuit 23 for delaying an output of the comparator 19 and an AND circuit 24 receiving the output of the comparator 19 and an output of the delay circuit 23. The comparator 19 has the above described relative threshold value A associated with the contents held in the memory 17 and a threshold value B (75% of the reference value held in the memory 17, according to the present embodiment) other than the above described threshold value A, and functions to output a signal at the "H" level when the difference between the contents held in the memory 17 and the current focus evaluating value is more than the above described threshold value A and less than the above described threshold value B. Furthermore, in the detecting circuit 61, the delay circuit 23 delays the output of the comparator 19 by a time period T1.

The above described delay time T1 is set as the time period (for example, T1=0.1 sec.) expected to be required until the other object Q has entered an automatic focusing area AF in the above described FIGS. 3A and 3C, and the above described metastable time period T2 is set as the time period (for example, T2=0.5 sec.) expected to be required until the other object has passed through the automatic focusing area AF in FIG. 3A.

Additionally, both outputs of the AND circuits 22 and 24 are applied as inputs of an OR circuit 25. An output of the OR circuit 25 is supplied to the focusing motor control circuit 14 as an object change detection signal.

Figure 5:
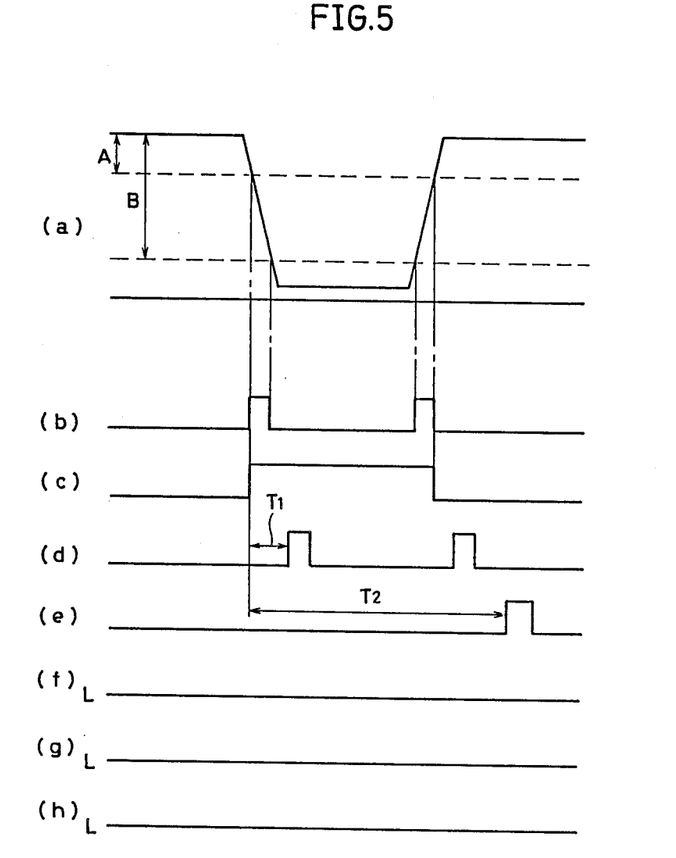
FIGS. 5, 6 and 7 are timing charts for explaining operation of the automatic focusing circuit shown in FIG. 4.
Figure 6:
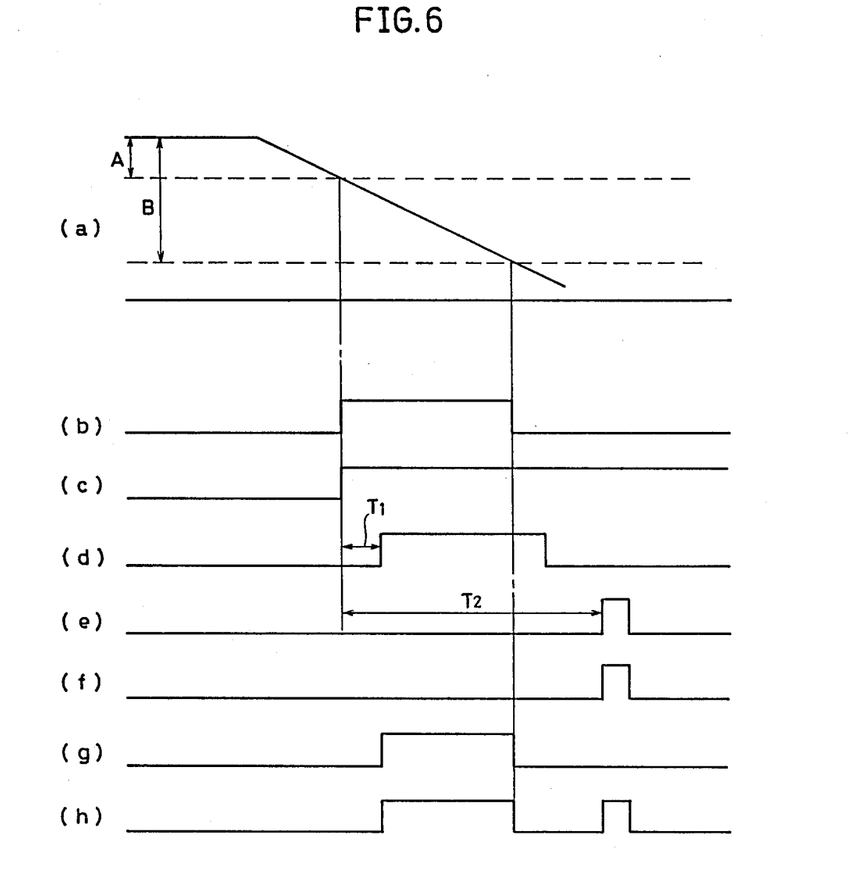
Figure 7:
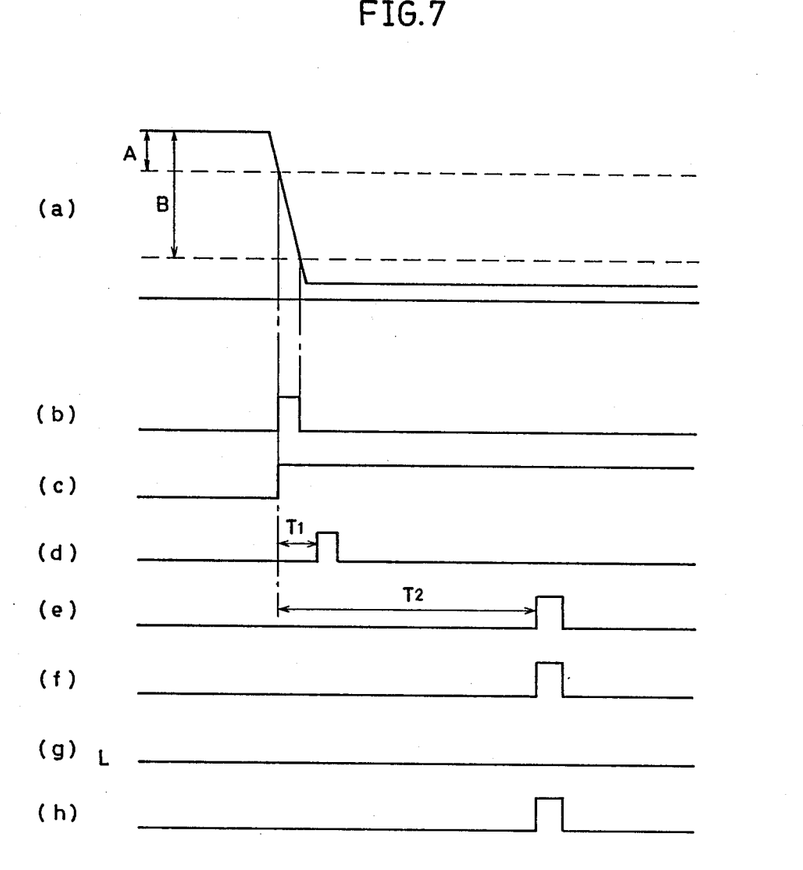

FIGS. 5, 6 and 7 are timing charts for explaining an operation of such an object charge detecting circuit 50. Referring now to FIGS. 1 and 5 to 7, description is made of the operation of the object change detecting circuit 50.

The timing charts of FIGS. 5 to 7 correspond to the states shown in FIGS. 3A to 3C, respectively. More specifically, FIG. 5 shows an operation of the object change detecting circuit 50 to occur when the other object Q passes in front of the camera Ca while the original object P is being recorded (in a first case) as shown in FIG. 3A. FIG. 6 shows an operation of the object change detecting circuit 50 to occur when tee original object P itself approaches the camera Ca (in a second case) as shown in FIG. 3B. FIG. 7 shows an operation of the object change detecting circuit 50 to occur when the other object Q enters the automatic focusing area AF and is stopped therein while the original object P is being recorded (in the third case) as shown in FIG. 3C.

In FIGS. 5, 6 and 7, (a) shows how the focus evaluating value is changed with time if the lens is fixed in the lens position where the original object P is in focus, an axis of ordinate representing the focus evaluating value, and axis of abscissa representing the time and dotted lines representing the above described threshold values A and B. In addition, in FIGS. 5 to 7, (b) shows the output of the comparator 19, (c) shows the output of the comparator 18, (d) shows the output of the delay circuit 23, (e) shows the output of the second monostable multivibrator 21, (f) shows the output of the AND circuit 22, (g) shows the output of the AND circuit 24 and (h) shows the output of the OR circuit 25.

In the above described first case, when the object Q enters the automatic focusing area AF, the focus evaluating value is decreased until the focus evaluating value is below the threshold value B once. However, since the object Q has passed through the automatic focusing area by the time period T2, the focus evaluating value is recovered to the original level within the time period T2. More specifically, since the other object has passed in from of the camera, so that the focus evaluating value has dropped extremely fast, a pulse width (corresponding to the time period when the difference between focus evaluating values is more than the threshold value A and less than the threshold value (B) of the output (b) of the comparator 19 is shorter than the predetermined delay time T1. Thus, a signal at the "H" level is not outputted as the output (g) of the AND circuit 24 receiving the signal (b) and the output (d) of the delay circuit 23. In addition, since the other object Q has passed through the automatic focusing area within the time period T2, the output (f) of the AND circuit 22 receiving the output (c) of the comparator 18 and the output (e) of the second monostable multivibrator 21 remains at an "L" level. Thus, the object change detection signal (h) which is the output of the OR circuit 25 remains at the "L" level. More specifically, in the first case, the focusing motor control circuit 14 does not recognize that the object changed, so that the focusing motor control circuit 14 does not resume an automatic focusing operation.

In the above described second case, the focus evaluating value is changed relatively slowly as shown by (a) in FIG. 6. The pulse width of the output (b) of the comparator 19 exceeds the time period T1. Consequently, the output (g) of the AND circuit 24 receiving the signal (b) and the output (d) of the delay circuit 23 attains the "H" level after the delay of the time period T1 from the rise of the output (b) of the comparator 19. In addition, the output (f) of the AND circuit 22 receiving the output (c) of the comparator 18 and the output (e) of the second monostable multivibrator attains the "H" level after the delay of the time period T2 from the rise of the output (c) of the comparator 18. The above described output (g) preceding the output (f) is supplied as the object change detection signal (h) to the focusing motor control circuit 14 through the OR circuit 25. The focusing motor control circuit 14 is responsive to the object change detection signal (h) for clearing the contents stored in the initial value memory 11 and the maximum value memory 10 and resuming a series of automatic focusing operations. More specifically, since the change of the object can be quickly confirmed by the object change detection signal (h) preceding the output (f) of the detecting circuit 60, an automatic focusing operation having good follow-up characteristics can be achieved even if the original object P itself approaches the camera Ca as shown in FIG. 3B.

Finally, in the above described third case, since the other object Q enters suddenly the automatic focusing area AF, the focus evaluating value is decreased rapidly as shown in FIG. 7(a), so that the pulse width of the output (b) of the comparator 18 is shorter than the delay time T1. Thus, the output (g) of the AND circuit 24 receiving the signal (b) and the output (d) of the delay circuit 23 remains at the "L" level. On the other hand, the output (c) of the comparator 18 rises in synchronization with the rise of the output (b). Therefore, since the other object Q is stopped in the automatic focusing area, the output (c) remains at the "H" level. Consequently, the output (f) of the AND circuit 22 receiving the output (c) and the output (e) of the second monostable multivibrator 21 attains the "H" level after the delay of the time period T2 from the rise of the output (c) of the comparator 18. The output (g) is supplied as the object change detecting signal (h) to the focusing motor control circuit 14 through the OR circuit 25, so that the automatic focusing operation is resumed. Thus, in this third case, after a relatively long delay of the time period T2 from the time when the other object comes in front of the camera Ca, the automatic focusing operation is resumed. However, if and when the distance between the object and the lens is rapidly changed considerably, about two seconds are required from the time when the focusing motor 3 begins to be driven to the time when the in-focus state is achieved, so that the time delay of approximately the above described time period T2 (for example, 0.5 sec.) offers no problem in practice.

As described in the foregoing, according to the embodiment of the present invention, the automatic focusing operation can be prohibited when an object passes in front of a camera in the in-focus state and the automatic focusing operation can be resumed quickly when the original object itself gradually approaches and leaves the camera, so that a stable automatic focusing operation can be achieved as a whole.

Although in the above described embodiment, a case was described in which a signal which takes the maximum value in the in-focus position is employed as a focus evaluating value, a signal which takes the minimum value in the in-focus position may be employed as a focus evaluating value and a circuit for detecting the minimum value may be provided so that the minimal value of the detected value is controlled to be maintained, in which case the same effect can be obtained.

In addition, although in the above described embodiment, the integration circuit 5f of an analog type was employed, an integration circuit of a digital type containing an A/D converter can be employed.

Furthermore, operations according to the above described embodiments can be easily processed in a software manner by a microprocessor.

Furthermore, although in the above described embodiment, the focus ring position signal generated from the focusing ring 2 was held in the focusing ring position memory 15 so that a focusing ring position signal corresponding to the maximum value of the focus evaluating value and the current focusing ring position signal are compared with each other by the comparator 16, the focusing motor position signal may be detected from the focusing motor 3 and substituted for the focusing ring position signal, in which case the same effect can be obtained.

Additionally, focus evaluating values may be detected not just every one field but every one frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing circuit for automatically matching the focus relative to an object in response to a video signal obtained from image sensing means having a focusing lens and an image sensor, comprising:
   relative position changing means (2, 3) for changing the relative position in the direction of an optical axis of said focusing lens relative to said image sensor,
   focus evaluating value detecting means (5) for detecting at constant time periods a level of a pre-selected high frequency component of the video signal obtained from said image sensing means, converting the level into either a focus evaluating value which takes the maximum value in the in-focus position or a focus evaluating value which takes the minimum value in the in-focus position and sequentially supplying the same,
   control means (10, 11, 12, 13, 14, 15, 16) responsive to the focus evaluating value supplied from said focus evaluating value detecting means for controlling said relative position changing means such that the relative position of said focusing lens is once fixed in the position where said focus evaluating value takes the maximum value or the minimum value, and
   object change detecting means (50) responsive to the change of the focus evaluating value supplied from said focus evaluating value detecting means for detecting the change of said object after the relative position of said focusing lens is fixed by said control means,
   said object change detecting means comprising
      first memory means (17) for holding as a reference value said focus evaluating value at a time point when the relative position of said focusing lens is fixed by said control means,
      first detecting means (61) for determining that the focus evaluating value supplied from said focus evaluating value detecting means is decreased to a predetermined level with respect to the reference value held in said first memory means within a predetermined first time period,
      second detecting means (60) for determining that the focus evaluating value supplied from said focus evaluating value detecting means remains at a level less than said predetermined level over a predetermined second time period which is longer than said first time period after the focus evaluating value is decreased to said predetermined level within said first time period, and
      means (25) for supplying outputs of said first and second detecting means to said control means,
   said control means being responsive to outputs of said first and second detecting means for resuming control of the relative position of said focusing lens.

2. An automatic focusing circuit according to claim 1, wherein said focus evaluating value detecting means converts a video signal corresponding to a predetermined sampling area into a focus evaluating value at every one of said constant time periods,
   said first time period being a first pre-defined fixed time period which is set to be sufficiently long for another object other than said object to enter a field of view corresponding to said sampling area, and
   said second time period being a second pre-defined fixed time period which is set to be sufficiently long for the other object pass through said field of view.

3. An automatic focusing circuit according to claim 2, wherein said control means resumes control of the relative position of said focusing lens after a lapse of said second tine period when the output of said first detecting means shows that said focus evaluating value is decreased to said predetermined level within said first time period and the output of said second detecting means shows that said focus evaluating value remains at a level less than said predetermined level over said second time period.

4. An automatic focusing circuit according to claim 2, wherein said control means does not resume control of the relative position of said focusing lens when the output of said first detecting means shows that said focus evaluating value is decreased to said predetermined level within said first time period and the output of said second detecting means shows that said focus evaluating value does not remain at a level less than said predetermined level over said second time period.

5. An automatic focusing circuit according to claim 2, wherein said control means resumes control of the relative position of said focusing lens after a lapse of said first time period when the output of said first detecting means shows that a time period which is more than said first time period is required until said focus evaluating value is decreased to said predetermined level.

6. An automatic focusing circuit according to claim 2, wherein said first detecting means comprises
- first comparing means (19) having a relative first threshold value associated with said reference value held in said first memory means and a second threshold value which is larger than the first threshold value and generating a first signal when the difference between said reference value and the focus evaluating value outputted from said focus evaluating value detecting means is between said first and second threshold values,
- delay means (23) for outputting a second signal obtained by delaying said first signal by said first time period, and
- first AND means (24) for ANDing said first signal and said second signal.

7. An automatic focusing circuit according to claim 2, wherein said second detecting means comprises
- second comparing means (18) having said first threshold value and generating a third signal when the difference between said reference value and the focus evaluating value supplied from said focus evaluating value detecting means exceeds said first threshold value,
- means (20) for generating a fourth signal having a duration which is equal to said second time period in synchronization with the third signal generated from said second comparing means,
- means (21) for generating a fifth signal in synchronization with termination of said fourth signal, and
- second AND means (22) for ANDing said third signal and said fifth signal.

8. An automatic focusing circuit according to claim 2, wherein means for supplying the outputs of said first and second detecting means to said control means comprises OR means (25) for ORing outputs of said first and second AND means.

9. An automatic focusing circuit according to claim 2, wherein said focus evaluating value detecting means comprises
- synchronizing signal separating means (5a) for separating a vertical synchronizing signal and a horizontal synchronizing signal from said video signal,
- gate means (5b, 5c) for passing at every one of said constant time periods said video signal within said sampling area set in response to said vertical synchronizing signal and said horizontal synchronizing signal separated by said synchronizing signal separating means,
- filtering means (5d) for extracting said pre-selected level of a high-frequency component of a video signal which passed through said gate means,
- integrating means (5f) for integrating the level of the pre-selected high-frequency component of the video signal extracted by said filtering means, and
- analog/digital converting means (5g) for converting an output of said integrating means into a digital output.

10. An automatic focusing circuit according to claim 1, wherein said relative position changing means comprises a focusing ring (2) and a focusing motor (3) for moving the focusing lens in the direction of the optical axis.

11. An automatic focusing circuit according to claim 1, wherein said relative position changing means comprises a piezoelectric element for moving the focusing lens or the image sensor in the direction of the optical axis.

12. An automatic focusing circuit according to claim 1, wherein said control means comprises means (11, 13, 14) for initializing the direction of the change of the relative position of said focusing lens immediately after an operation for automatically matching the focus is started.

13. An automatic focusing circuit according to claim 12, wherein said initializing means comprises
- means 14) for changing the relative position of said focusing lens in a predetermined direction when the operation for automatically matching the focus is started,
- second memory means (11) for holding the initial value of the focus evaluating value outputted from said focus evaluating value detecting means, and
- third comparing means (13) for comparing the initial value of the focus evaluating value held in said second memory means with a current value of the focus evaluating value provided by said focus evaluating value detecting means and designating the direction of the change of the relative position of said focusing lens.

14. An automatic focusing circuit according to claim 12, wherein said relative position changing means supplies information associated with the relative position of the focusing lens,
said control means comprising
- third memory means (10) for always holding the maximum value or the minimum value of said focus evaluating value,
- fourth comparing means (12) for comparing the maximum value or the minimum value of the focus evaluating value held in said third memory means with a current value of the focus evaluating value provided by said focus evaluating value detecting means and determining that the relative position of said focusing lens passed through the position where said focus evaluating value takes the maximum value or the minimum value,
- fourth memory means (15) for holding information associated with the relative position of said focusing lens where said focus evaluating value takes the maximum value or the minimum value,
- means (14) responsive to determination by said fourth comparing means for controlling said relative position changing means so that the direction of the change of the relative position of said focusing lens is reversed, and
- fifth comparing means (16) for comparing the information held in said fourth memory means with information associated with the relative position of said focusing lens supplied after the direction of the change of the relative position of said focusing lens is reversed and controlling said relative position changing means so that the change of the relative position of said focusing lens is stopped when both coincide with each other.

15. An automatic focusing circuit according to claim 14, wherein the information associated with the relative position of said focusing lens comprises information associated with the position of the focusing ring for moving the focusing lens in the direction of the optical axis.

16. An automatic focusing circuit according to claim 14, wherein the information associated with the relative position of said focusing lens comprises information associated with the rotational position of the focusing motor for moving the focusing lens in the direction of the optical axis.

17. An automatic focusing circuit according to claim 1, wherein each of said constant time period is the time period corresponding to one field of said video signal.

18. An automatic focusing circuit according to claim 1, wherein each of said constant time periods is the time period corresponding to one frame of said video signal.

* * * * *